United States Patent Office 3,343,111
Patented Sept. 19, 1967

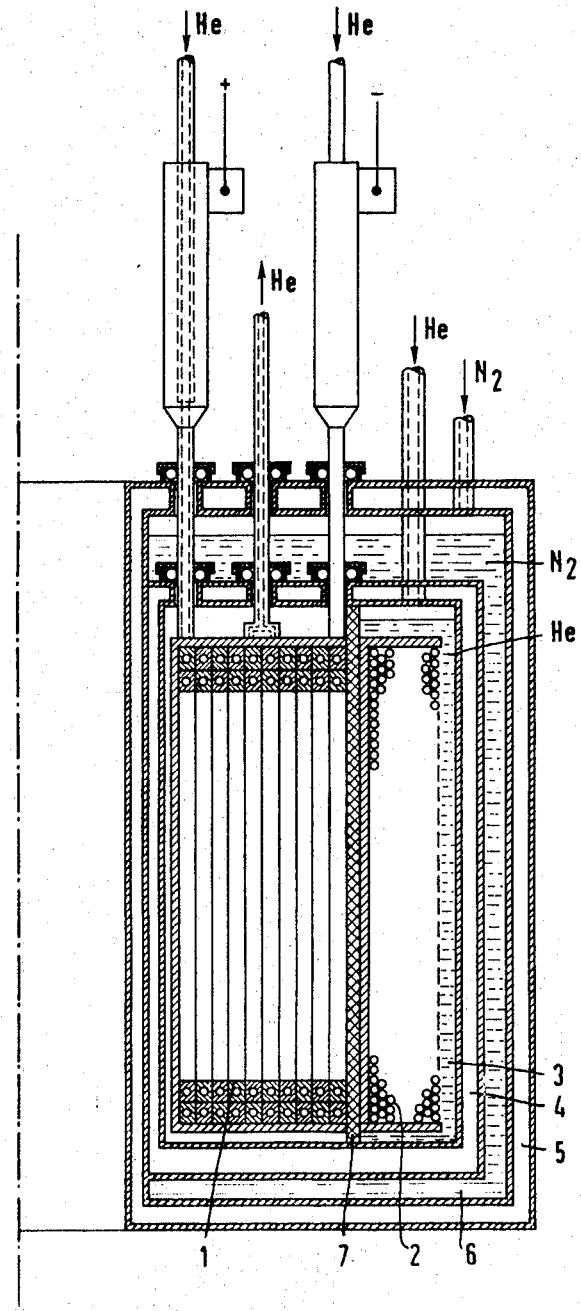

3,343,111
HIGH FIELD STRENGTH MAGNETIC DEVICE
Wilhelm Kafka, Tennenlohe, Germany, assignor to Siemens-Schuckertwerke Aktiengesellschaft, Berlin-Siemensstadt, Germany, a corporation of Germany
Filed Apr. 7, 1965, Ser. No. 446,362
Claims priority, application Germany, May 8, 1964,
S 90,971
9 Claims. (Cl. 335—216)

My invention relates to magnetic devices. More particularly, it relates to novel magnetic devices for producing high field strengths.

For producing field strengths of 100 to 200 kilogauss in a free volume of several cubic centimeters, there has been heretofore utilized the so-called Bitter magnet. The latter device is a copper solenoid which is operated with a very high current density and which requires a very large volume of coolant. The operating power requirement for this type of magnet is extremely high (in the order of 2.5 million watts for a device having an inner coil diameter of 5 centimeters). The coolant volume requirement is several thousand gallons of cooling water per minute.

Thus, if there is considered an example of the cost of operation of a Bitter magnet such as one which produces a field strength of 200 kilogauss, the required power to operate such magnet is 8 million watts. If there is assumed a cost of $25.00 per kilowatt year, the operation of this magnet runs to $200,000.00 per year.

In an attempt to lower the operating power requirement for high field producing magnetic devices, there have been employed super-sonducting coils instead of water-cooled copper coils. However, magnetic field strengths up to 100 kilogauss have been difficultly obtained thereby. There have also been utilized magnetic devices having both normally conducting and superconducting windings. In such devices, the windings are magnetically coupled and the normally conducting winding serves to establish a continuous current in a closed circuit superconducting windings. However, in the latter type structure, since the normally conducing winding functions merely to provide continuous current for the superconducting winding, no enhancement in the size of the field strength of superconducting coil devices has resulted.

Accordingly, it is an important object of this invention to provide a novel high field strength magnetic device which is capable of producing field strengths in excess of 100 kilogauss with low operating power requirements.

It is a further object to provide a magnetic device in accordance with the preceding object which has an inner diameter of several centimeters.

These objects are obtained by providing a magnetic device having at least one normally conducting and at least one superconducting winding. The normally conducting winding is arranged within the superconducting winding and excitation power is supplied to both windings in a direction such that the magnetic fields produced by the windings have the same direction and are in additive relationship. This is to be distinguished from the arrangement where the normally conducting winding, magnetically coupled to the superconducting winding, serves only to establish a continuous current in the superconducting winding. In the magnetic device according to the invention, the magnetic fields produced by the two windings reinforce each other. Thus, there is enabled the producing of a very strong magnetic field at much smaller operating costs than have been possible heretofore.

Generally speaking and in accordance with the invention, there is provided a magnetic device comprising an inner-disposed normally conducting winding and an outer-disposed superconducting winding, the windings being adapted to be connected to an electrical power source to produce respective magnetic fields in additive relationship in the device.

The foregoing and more specific objects and features of my invention will be apparent from, and will be mentioned in the following description of a high field strength magnetic device according to the invention shown by way of example in the accompanying drawing in which the sole figure is a vertical section taken along a radius of a magnetic device constructed in accordance with the principles of the invention.

Referring now to the figure, the high magnetic fiield strength device shown therein comprises an inner-disposed normally conducting widing 1 and an outer-disposed superconducting winding 2. Normally conducting winding 1 suitably comprises a highly pure metal such as aluminum, copper, or sodium for lower field strengths, as is further explained hereinbelow, and superconducting winding 2 suitably comprises a suitable material such as a niobium-titanium or nobium-zirconium alloy. A jacket 3 is provided around superconducting winding 2 which contains liquid helium to cool superconducting winding 2 to a temperature of about 4.2° K. A vacuum jacket 4 is provided to encompass both helium containing jacket 3 and normally conducting winding 1. A jacket 6 containing liquid nitrogen is provided to encompass vacuum jacket 4 and a vacuum jacket 5 is provided to encompass liquid nitrogen containing jacket 6.

Normally conducting winding 1 suitably comprises a tubular structure through which cold helium gas is passed to maintain the temperature of winding 1 at a temperature of about 10 to 20° K. Between normally conducting winding 1 and superconducting winding 2, there is provided a heat insulation 7, suitably comprising a material highly resistant to compression, an example of such material being a fabric made of glass fiber, the presence of such compression resistant heat insulation 7 enabling the taking up through superconducting winding 2 of the radially directed compression forces appearing in normally conducting winding 1. The ends of windings 1 and 2 are adapted to be connected to an electric power source such that the magnetic fields developed in each of windings 1 and 2 are in additive relationship, i.e., they are connected to the power source such that they provide like directional magnetic fields.

In the operation of the magnetic device shown in the figure, in the event that there is desired a magnetic field equal to or less than that capable of being produced by superconducting winding 2, i.e., a field of 70 kilogauss or less, it is preferred that only superconducting winding 2 be excited, exciting current being supplied gradually thereto whereby the magnetic field developed by supedconducting winding 2 is correspondingly gradually increased until the maximum magnetic field which superconducting winding 2 is capable of producing is attained. Then, if a magnetic field greater than such maximum is desired, normally conducting winding 1 may have exciting current supplied thereto.

Although not shown in the figure, it is to be realized that the device therein should be provided with means for protecting superconducting winding 2 against overvoltages and local overheating under spontaneous transitions from a super to its non-superconducting state and means for providing protection to normally conducting winding 1 against overvoltages which may be induced therein in response to transitions in superconducting winding 2. Since such means are well known in the art, for simplicity of depiction, they have been omitted from the figure and no further description and explanation of their structure and operation are deemed necessary.

Where it is desired to provide magnetic fields greater than 100 kilogauss, because of the great forces appearing as a result of such magnetic field strengths, it is preferable that the material constituting normally conducting winding 1 be an especially strong conductive metal alloy rather than a pure metal as set forth hereinabove. Suitable examples of such metal alloy are copper-beryllium, copper-chromium and copper-zirconium. Although it is understood that the aforesaid metal alloys may not produce as great a conductivity yield upon cooling as the hereinabove mentioned pure metals, their respective yields are still sufficiently advantageously high whereby the combination of normally conducting winding 1 comprised thereof and superconducting winding 2, provided in accordance with the principles of the invention still requires vastly less power consumption than the hereinabove described Bitter magnet for producing magnetic fields of the same strengths. Where normally conducting winding 1 is chosen to comprise one of the aforementioned metal alloys, they need not be operated at the low 10 to 20° K. temperature required for the pure metal since their conductivity yield is not commensurate with such great degree of cooling, but are preferably operated at a higher temperature such as the coolant temperature of liquid nitrogen.

In comparing the operation of the magnetic device shown in the figure with the Bitter magnet, let it be assumed that normally conducting winding 1 is capable of producing a 30 kilogauss magnetic field whereby it may have an inner coil diameter about 5 cms. and whereby the total field produced by the device is 100 kilogauss, i.e., the magnetic field produced by normally conducting winding 1 and the 70 kilogauss field produced by superconducting winding 2. For producing a 100 kilogauss field with a Bitter magnet, the power operating requirement is 2.5 million watts, the dissipation of which must be eliminated by extensive water cooling. By contrast, if normally conducting winding 1, for example, comprises pure aluminum cooled to a temperature of 10 to 20° K., then there is about 500 watts power dissipation in normally conducting winding 1 which has to be eliminated by cooling. Its instantaneous power dissipation is about 50 kilowatts which has to be eliminated by cooling, such 50 kilowatts amount being only 2% of the power dissipation of the commensurately high magnetic field producing Bitter magnet. The power dissipation for superconducting winding 2 is negligibly small as compared to the 50 kilowatts amount.

Let it be assumed that a magentic field strength of 200 kilogauss is desired. As mentioned hereinabove, the Bitter magnet, to produce such high strength magnetic field, requires 8 million watts of power for operation which may cost $200,000.00 per year. If the magnetic device according to the invention is operated such that superconducting winding 2 produces its 70 kilogauss magnetic field and normally conducting winding 1 produces a 130 kilogauss magnetic fiield (in this situation, winding 1 suitably comprises one of the aforementioned metal alloys and is cooled with liquid nitrogen), then the power loss of normally conducting winding 1 turns out to be 100 kilowatts and the instantaneous power dissipation which has to be cooled is about 1000 kilowatts. The latter power dissipation figures are based upon the use of liquid nitrogen as the coolant for normally conducting winding 1 which has a temperature of about 77° K. It is thus seen that with the magnetic device of the invention, where a 200 kilogauss magnetic field is produced, the power relationship between it and the Bitter magnet is about 1 to 12 whereby a saving in excess of 85% is enabled. Such saving may be even further enhanced if the peak power is not continuously required but is only required a small fraction of each day, such as 1/10 of the day. This is because the coolant energy, in contrast to the excitation power, can be accumulated whereby the power dissipation requirements can be distributed over an entire day period. In such situation, for example, the power dissipation which has to be cooled, i.e., the cooling power is only 100 kilowatts, i.e., only 1/10 of the 1000 kilowatts power dissipation with continuous peak power. If it is considered the excitation power requirement for producing the magnetic field of 200 kilogauss is 100 kilowatts and the power which is dissipated and has to be cooled is 100 kilowatts in the distributed power situation which signifies a handling of 200 kilowatts of power, such 200 kilowatts is only one-fortieth of the 8 million watts required in the operation of the Bitter magnet for producing the same 200 kilogauss magnetic field. Consequently, a saving of power costs of about 97% may be effected with the magnetic device of the invention as compared with the costs for operating the Bitter magnet.

It will be obvious to those skilled in the art upon studying this disclosure that high field strength magnetic devices according to my invention permit of a great variety of modifications and, hence, can be given embodiments other than those particularly illustrated and described herein without departing from the essential features of my invention and within the scope of the claims annexed hereto.

I claim:

1. A magnetic device comprising an inner-disposed section comprising a normally conducting winding comprising a normally conductive metallic material, an outer-disposed section comprising a material capable of being superconductive at and below a given temperature, a heat insulating material interposed between said inner and outer-disposed sections, said windings being adapted to be connected to an electrical power source to produce respective magnetic fields in additive relationship in said device, means associated with said superconducting winding for maintaining it at and below said given temperature and cooling means associated with said normally conducting winding for maintaining it at a low temperature.

2. A magnetic device comprising an inner-disposed section comprising a normally conducting winding comprising a normally conductive tubular metallic material, an outer-disposed section comprising a superconducting winding comprising a material capable of being superconductive at and below a given temperature, said windings being adapted to be connected to an electrical power source to produce respective magnetic fields in additive relationship in said device, a compression resistant heat insulation material interposed intermediate said inner and outer sections, a jacket adapted to be connected to a liquid helium source encompassing said outer section for containing liquid heilum for maintaining said superconducting material at or below a temperature of 4.2° K., means adapted for connecting said tubular normally conducting winding to a coolant source to pass said coolant through said normally conducting winding to maintain said last named winding at a low temperature.

3. A magnetic device comprising an inner-disposed section comprising a normally conducting winding comprising a normally conductive tubular metallic material, an outer-disposed section comprising a superconducting winding comprising a material capable of being superconductive at and below a given temperature, said windings being adapted to be connected to an electrical power source in a direction to produce respective magnetic fields in additive relationship in said device, a compression resistant heat insulation material interposed intermediate said inner and outer sections, a first jacket adapted to be connected to a liquid helium source encompassing said outer section for containing liquid helium for maintaining said superconducting material at or below a temperature of 4.2° K., a second vacuum jacket encompassing said first jacket and said inner disposed section, a third jacket encompassing said first jacket and adapted to be connected to a first source of a coolant material for containing said coolant, a fourth vacuum jacket encompassing said third jacket, and means adapted for connecting said tubular normally conducting winding to a second source of a coolant material to pass said second coolant through said normally conducting winding to maintain said last named winding at a low temperature.

4. A magnetic device as defined in claim 3 wherein said superconducting material is selected from the group consisting of a niobium-titanium and a niobium-zirconium alloy.

5. A magnetic device as defined in claim 4 wherein said normally conducting material comprises a pure metal element.

6. A magnetic device as defined in claim 5 wherein said metal element is selected from the group consisting of aluminum, coper and sodium, wherein said first coolant is liquid nitrogen and wherein said second coolant is helium gas sufficiently cooled to maintain said normally conducting winding at a temperature of between about 10 to 20° K.

7. A magnetic device as defined in claim 4 wherein said normally conducting material comprises a metallic alloy.

8. A magnetic device as defined in claim 7 wherein said alloy is selected from the group consisting of a copper-beryllium, a copper-chromium and a copper-zirconium alloy, wherein said first and second coolants respectively are liquid nitrogen, said second coolant maintaining said normally conducting winding at a temperature of about 77° K.

9. A magnetic device as defined in claim 4 wherein said compression resistant heat insulating material comprises glass fiber fabric.

References Cited

UNITED STATES PATENTS

| 3,177,408 | 4/1965 | Mills et al. | 335—216 X |
| 3,185,900 | 5/1965 | Jaccarino et al. | 335—216 |
| 3,250,958 | 5/1966 | Rothwarf et al. | 335—216 X |

BERNARD A. GILHEANY, *Primary Examiner.*

G. HARRIS, JR., *Assistant Examiner.*